Patented Nov. 16, 1948

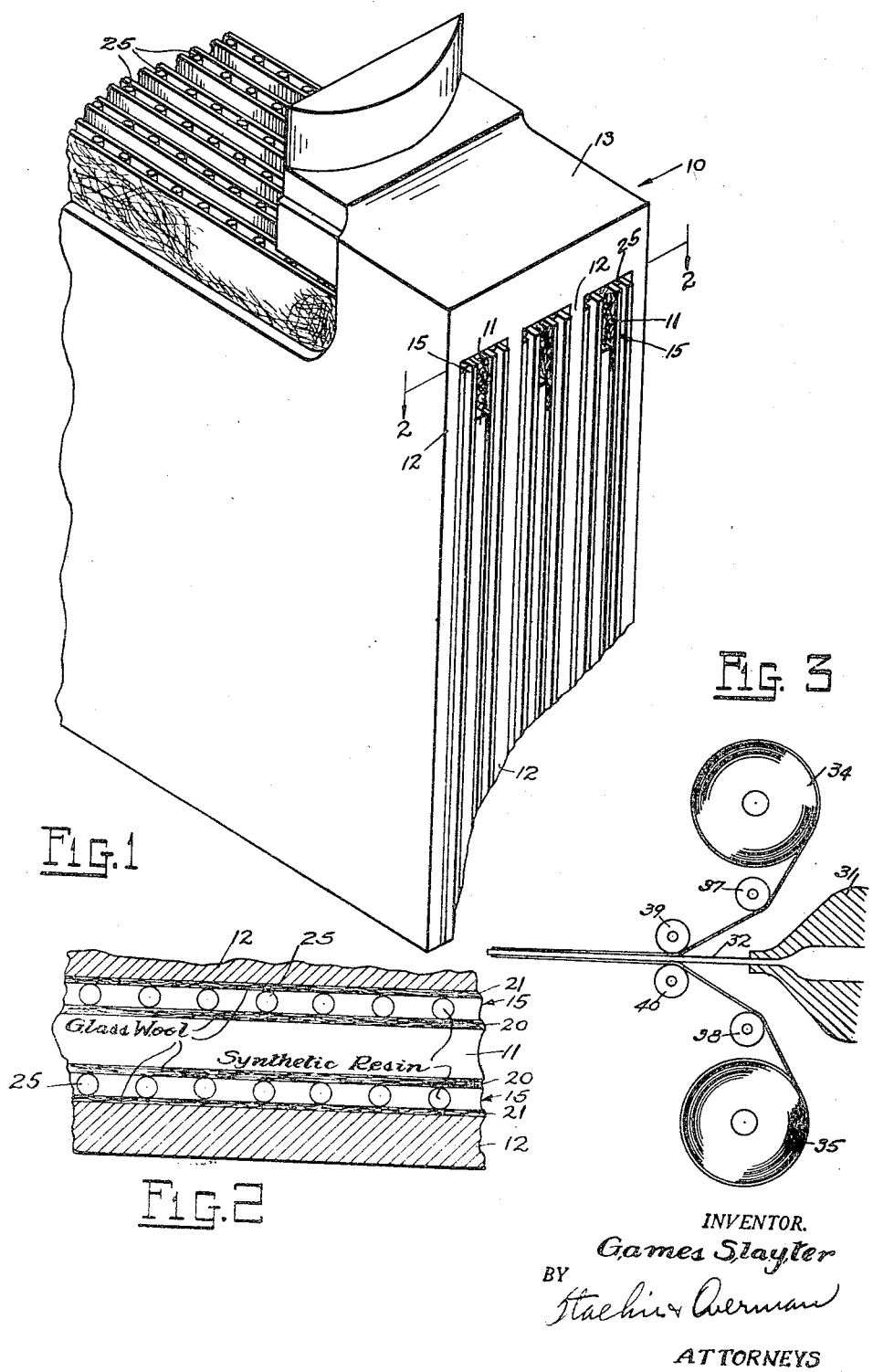

2,454,100

UNITED STATES PATENT OFFICE 2,454,100

BATTERY PLATE SEPARATOR

Games Slayter, Newark, Ohio, assignor to Owens-Corning Fiberglas Corporation, a corporation of Delaware Application December 20, 1943, Serial No. 515,039

4 Claims. (Cl. 136—145)

This invention relates to storage batteries and more particularly to insulating separators employed to space the plates in the battery.

The separators for storage battery plates most generally used at present are made of wood that is ribbed on the side adjacent the positive plate. The spaces between the ribs permit free flow of the electrolyte and escape of the gases evolved at the positive plate. These wood separators have a tendency to split in use with the result that the active material working loose from the positive plate may build up on the positive plate in a manner to bridge across through the split to the negative plate. When this happens the positive and negative plates are short-circuited and the battery soon fails.

Wooden separators are also unsatisfactory, especially in heavy duty batteries, because they oxidize on the side adjacent the positive plate and this deterioration of the separator eventually affects the life of the battery. The use of wooden separators also prevents shipping batteries "dry," that is, without the electrolyte, because then atmospheric changes affect the wooden separator. Consequently the batteries must be shipped with the electrolyte therein and the handling of the batteries during transportation is thus complicated.

To overcome this last difficulty the separators have been made out of porous rubber. Such separators have not gained wide acceptance because of the relatively high cost of the separator. This cost was prohibitive in the case of most of the standard types of batteries and porous rubber battery separators were employed only for expensive batteries such as the very heavy-duty types.

Another type of separator that has been suggested is disclosed in the Waddell Re-issue Patent No. 16,548 dated February 8, 1927. This separator was formed of a sheet of glass wool in connection with a thin sheet of porous wood. The primary purpose of the glass wool, which was placed against the positive plate, was to prevent disintegration of the peroxide paste on the negative plate. The tendency of the fine particles of peroxide to percolate through the glass wool and bridge over between the negative and positive plates (which effect is called "treeing") was prevented by the wood or other porous diaphragm. Although this type of separator was effective in increasing the life of the battery by holding the active paste in place on the positive plate, it was to a large extent still subject to most of the disadvantages present in older batteries because of the presence of the wood diaphragm which was depended upon to prevent bridging over of particles of active material from the positive to the negative plates.

It is an object of the present invention to provide an efficient and inexpensive separator for battery plates that will increase the life of the battery by retaining the active material in place on the plates and that will effectively prevent "treeing" from the positive to the negative plate, that is, building up of loosened active material in such a manner that it bridges across from the positive to the negative plate.

A further object of the invention is to provide a separator for battery plates that increases the efficiency of the battery and that decreases internal resistance by permitting ready flow of the electrolyte.

A still further object is to provide a separator for battery plates that will permit ready escape of gas evolved at the positive plate.

The invention comprises a separator for battery plates formed of two or more thin mats of fine glass fibers held together in spaced relation by means of rods or filaments of flexible, resilient resin. The mats of fine glass fibers are replete with minute pores so that the electrolyte is permitted to flow through the mats but at the same time the active material on the plates is prevented from falling away from the plates.

Further features of the invention include the use of spacers of rods or filaments of thermoplastic resins to facilitate assembly of the separator, and the use of fibrous glass mats of different thicknesses with the thicker mat next to the positive plate, from which the active material sheds usually in the greater quantities.

This invention is an improvement of the battery separator disclosed in my prior Patent No. 2,117,371 of May 17, 1938.

The preferred embodiment of the present invention is illustrated in the drawing in which:

Figure 1 is a perspective view of a battery cell unit;

Figure 2 is a cross-sectional view taken on the line 2—2 of Figure 1;

Figure 3 is a schematic sectional view illustrating apparatus for producing continuously the product of the present invention.

Referring to Figure 1, the usual battery includes a number of cells each containing an assembly 10 of alternately arranged positive plates 11 and negative plates 12. The plates are held together by suitable means such as the terminal bar 13 at one end of the cell unit integral with the negative plates and a second terminal bar (not shown) located at the other end of the cell unit and connected to the positive plates.

Between each negative and positive plate a separator 15 is located. This separator is primarily to maintain the plates in spaced relation and is usually somewhat larger in area than the plates. In assembly of the battery, the plates are secured together in such a fashion that the separator and the plates are all under compression to maintain a rigid assembly.

According to the present invention, the separators, as shown in Figure 2, each comprises a pair of mats 20, 21 of glass fibers haphazardly and irregularly arranged and bonded into an integral sheet by means of a suitable binder such as starch, gelatin, phenol formaldehyde resin, furfural resin, or the like. The fibers of the mats are usually of from .0004 to .0008 inch in diameter. Such mats are similar to the types now available on the market as battery retainer mats.

The two mats are secured together in spaced relation by means of a plurality of small rods or filaments 25 of a flexible, resilient, firm resinous material. The rods or filaments are spaced apart a short distance, for example, one-quarter to one-half inch and are secured to the inner faces of both mats.

The rods may be secured to the mats by means of an adhesive compatible with both the resin of which the rod is formed and the bonding material used to hold the glass fibers together in the mat. The rods may also be secured to the mats by being assembled with the mats in the specified relation and the assembly heated quickly to render the rods slightly soft and tacky on their surfaces, after which the mats and rods are pressed together under a light pressure to cause the rods and mats to adhere together upon cooling.

Although a number of resins may be used to form the rods, they should all be characterized in being slightly resilient and firm though not brittle. If brittle materials, such as glass rods, are used to separate the mats, the warping of the plates that sometimes takes place during the use of the battery may cause the rods to crack or break and work loose from the mats with the consequent danger of permitting the plates to come into contact or at least to be separated from each other only by the two fibrous glass mats, which would then be in contact instead of spaced apart. In the first case, of course, the plates would be short-circuited and in the second case the active material working loose from the positive plate may "tree" through the two fibrous glass mats in contact and bridge across from the positive to the negative plate so that in this case, too, the plates would eventually be short-circuited.

If, however, the rods of resilient resin of the present invention are employed, warping of the plates does not result in breaking the rods between the two fibrous glass mats and the plates and the mats are maintained in spaced relation. "Treeing" of the oxides from the positive plate will be prevented by the space between the mats.

The resin used to form the spacing rods of the invention also should be subject to little or no cold flow or other deformation under normal operating temperatures of the battery and should be capable of resisting acid attack at operating temperature. Otherwise, due to deformation of the rods, the space between the fibrous glass mats may be decreased to such an extent that "treeing" may take place. For the same reason the resin should be sufficiently firm to resist the compressive force applied to the separators during assembly of the plates.

The resins preferred for the rods are the thermoplastic synthetic resins such as nylon, polystyrene, saran (vinylidene chloride), Vinyon (copolymer of vinyl chloride and vinyl acetate), Koroseal (plasticized polyvinyl chloride), acrylic acid ester resins such as methacrylate resins, for instance, Lucite, and the like. Other similar thermoplastic synthetic resins may also be used.

It is preferred to employ rods of resin that are substantially circular in cross-section so that a minimum portion of the area of the mats is blocked off where they are in engagement with the rods. The circular rods are in tangential relation with the inner faces of the mats and consequently contact the mats along very narrow lines, whereas rods or bars rectangular in cross-section or substantially so will cover greater areas of the mats where they contact the mats and thus cut down the effective area through which the electrolyte can pass.

For the purpose of increasing the effectiveness with which the active material is retained on the positive plate, the fibrous glass mat adjacent the positive plate may be thicker than the other mat. Ordinarily, the space between the plates of the batteries is from .05 to .09 inch. The separators of the present invention are approximately the same thickness with the individual fibrous glass mats being of from .01 to .03 inch thick, as desired, with the rods being resultantly about .03 inch in diameter. Where the mat next to the positive plate is made thicker it may be about .02 to .03 inch in thickness and the mat adjacent the negative plate may be about .01 inch thick.

For the same purpose one of the mats may be made of relatively fine fibers and the other of coarser fibers so that the sizes of the interstices are different in the two mats. For instance, the mat adjacent the positive plate may be of glass fibers of from .00001 inch or less in diameter and the fibers of the other mat of the separator may be from about .0004 to .0008 inch in diameter so that the mat next to the positive plate has the smaller interstices.

These figures are given by way of example only and are not to be taken as limitations of the invention.

When it is desired to secure the rods of resin to the fibrous glass mats by means of an adhesive any suitable material may be used for the purpose. The adhesive material should be one that is not adversely effected by the electrolyte in the battery, although this is not always necessary because the pressure of the plates on the separator will tend to hold the rods in place once the plates have been assembled. The adhesive material should also, of course, be compatible with the resin from which the rods are formed and I prefer to employ as the adhesive the resin from which the rods are formed dissolved in a suitable volatile solvent. This solution of resin is applied to the rods just before they are placed between the mats and after the solvent evaporates the rods and mats are securely bonded together.

In Figure 3 there is illustrated schematically an apparatus for producing the battery separator of the present invention continuously. This apparatus includes an extruding die 31 of ordinary kind from which the selected resin is extruded in the form of a plurality of spaced substantially round rods 32. At opposite sides of the extruding die, rolls 34, 35 of fibrous glass mat are supported on suitable spindles. The fibrous glass mats unwound from these rolls are led over rolls 37 and 38 to rolls 39 and 40. These latter rolls are located at opposite sides of the path of the rods as they are extruded from the die and are spaced apart a distance arranged to press the fibrous glass mats into close contact with the extruded rods. The distance between the rollers 39 and 40 and the end of the extruding die is such that the rods are still slightly soft and tacky at the time they are engaged between the fibrous glass mats so that upon hardening of the rods the mats and the rods are adhered together. The bonded assembly of the two mats separated by the rods of resin are then cut into suitable lengths to form the individual separators.

Various modifications of the present invention may be made within the scope of the appended claims.

I claim:

1. A battery plate separator comprising a pair of superposed fibrous glass mats, the mats being spaced apart with adjacent faces of said mats in uniformly spaced-apart relation over their substantially entire area by a plurality of rods of synthetic resin interjacent said mats and bonded in line contact to the inner faces of both mats, said rods being substantially circular in cross-section and being arranged in laterally spaced apart relation to provide for maximum circulation of electrolyte between the mats.

2. A battery plate separator comprising a pair of superposed fibrous glass mats, the mats being spaced apart with adjacent faces of said mats in uniformly spaced-apart relation over their substantially entire area by a plurality of laterally spaced round rods of synthetic thermoplastic resin interjacent said mats and bonded thereto in tangential contact, one of said mats being thicker than the other.

3. An electric storage battery including a plurality of alternately arranged positive and negative plates and insulating separators between said plates, each separator comprising a pair of superposed fibrous glass mats, the mats being spaced apart with adjacent faces of said mats in uniformly spaced-apart relation over their substantially entire area by a plurality of cross-sectionally circular rods of synthetic resin interjacent the two mats and bonded thereto in tangential contact, said rods being arranged in substantially vertical relation to provide open channels through the separator.

4. An electric storage battery including a plurality of alternately arranged positive and negative plates and insulating separators between said plates, each separator comprising a pair of superposed fibrous glass mats, the mats being spaced apart with adjacent faces of said mats in uniformly spaced-apart relation over their substantially entire area by a plurality of round laterally spaced parallel rods of synthetic resin interjacent the two mats to provide open channels through the separator, the fibrous glass mat adjacent the positive plate being thicker than the other mat of said pair.

GAMES SLAYTER.

REFERENCES CITED

The following references are of record in the file of this patent:

UNITED STATES PATENTS

| Number | Name | Date |
|---|---|---|
| 704,759 | Rodman | July 15, 1902 |
| 792,612 | Porter | June 20, 1905 |
| 2,117,371 | Slayter | May 17, 1938 |
| 2,176,427 | Kershaw | Oct. 17, 1939 |
| 2,344,614 | Hulse | Mar. 21, 1944 |
| 2,360,658 | Doughty | Oct. 17, 1944 |

FOREIGN PATENTS

| Number | Country | Date |
|---|---|---|
| 21,472 | Great Britain | Dec. 13, 1906 |
| 49,358 | France | Dec. 17, 1938 |
| 369,172 | France | Nov. 3, 1906 |
| 810,810 | France | Jan. 6, 1937 |
| 844,212 | France | Apr. 17, 1939 |